UNITED STATES PATENT OFFICE.

CARLETON ELLIS, OF MONTCLAIR, NEW JERSEY.

PROCESS OF MAKING CATALYTIC MATERIAL.

1,329,323.     Specification of Letters Patent.     Patented Jan. 27, 1920.

No Drawing.     Application filed January 31, 1919. Serial No. 274,357.

*To all whom it may concern:*

Be it known that I, CARLETON ELLIS, a citizen of the United States, and a resident of Montclair, in the county of Essex and State of New Jersey, have invented certain new and useful Improvements in Processes of Making Catalytic Material, of which the following is a specification.

This invention relates to a method of producing a catalyzer and relates especially to the reduction of nickel nitrate, nickel nitrite or similar nickel salt of an acid of the nitrogen oxid group under regulated reducing conditions to yield active catalytic material suitable for use in the hardening of oils.

Nickel nitrate is difficult to reduce in such a manner as to obtain a porous, finely divided, strongly catalytic substance which may be used for the hardening of oils.

In carrying out the operation according to the preferred form I heat nickel nitrate in a reducing drum first in the presence of steam and then in contact with a mixture of steam and hydrogen. The nickel nitrate first breaks down with the evolution of nitrous fumes which if in contact with a reducing gas would bring about such a local heating effect that sintering would occur, forming a nickel material which would be too coarse to have useful catalytic properties. On heating in the presence of steam however the nickel nitrate breaks down uniformly leaving a porous finely-divided product which subsequently is reduced with hydrogen or other reducing gas to form metallic nickel or other catalytic powdered nickel body.

In carrying out the invention nickel nitrate, nitrite or similar inorganic salt of nickel capable, on heating or reduction, of yielding a catalytic material, is preferably pulverized and heated in a revolving drum. In the first stages water may be evolved if the product has not first been well dried. After this water has been expelled steam may be admitted and subsequently a mixture of steam and carbon monoxid, hydrogen or other reducing gas, the temperature being carried to between 300 and 400° C. Preferably the reducing gaseous mixture is gradually enriched in reducing gas as the reaction of reduction progresses, so that at the end of the operation pure carbon monoxid, hydrogen or other reducing gas is present without dilution with any inert or extending gas and vapor. The critical point in the operation is the temperature at which nitrous fumes begin to evolve readily which is approximately at 200° C. From there on considerable reaction will take place when hydrogen or other combustible gas is used without a diluent and the local heating which may be caused is likely to sinter the catalyzer as stated. In addition there is the possibility of explosion due to mixtures of the nitrous oxid fumes with hydrogen or other reducing gas employed. Hence in the present invention it is an object to regulate the reducing conditions with respect to the evolution of nitrous fumes so that local heating of an objectionable character is avoided and a tendency to explosions minimized.

The operation may be carried out by, for example, drying nickel nitrate in an open pan until substantially free from moisture and then grinding to a fine powder. This is placed in a revolving drum or preferably an elongated cylinder which in fact may be fitted with conveyers so as to feed the product progressively along the cylinder so as to afford a continuous process of reduction. However in the simpler form of operation the nickel nitrate is agitated in a closed receptacle and the atmosphere in the receptacle is modified from time to time beginning preferably with steam or a mixture of steam and a small amount of hydrogen or other reducing gas and increasing the latter gradually as the temperature is raised to a final temperature of 350° or 400° C., at the end pure reducing gas being passed through the receptacle. When nickel nitrate is gradually heated in a current of hydrogen gas a particularly violent reaction occurs at about 240°, the mass glowing and sintered material being produced. Great care should be exercised in passing this point in the reducing operation to avoid such a sudden and violent reaction which is fatal to the success of the operation. To obtain the catalyzer in non-pyrophoric form nitrogen may subsequently be introduced into the receptacle to wash out the hydrogen. In place of reducing gas a reducing vapor such as the vapor of alcohol, gasolene and the like may be employed. Ammonia also may be used as a reducing agent. In some instances appropriate liquids may also be used as reducing agents, in an unvaporized condition. The expression "bathing fluid", as used in this application, is intended to cover gases, vapors and liquids. The receptacle is allowed to cool and when cold the catalyzer is withdrawn and may be introduced into oil and used as a hardening catalyzer. It is fairly non-pyrophoric. In a second modification of the invention, nickel nitrate is mixed with molten paraffin wax and gradually heated while being stirred. This operation is conveniently conducted in a deep vessel having a cover or lid which may be provided with an opening for drawing off gases and vapors. The mixture is heated preferably rather gradually. At about 200° C., considerable evolution of fumes of oxids of nitrogen appear and at this stage the heating should be checked for a period until the evolution of fumes of oxids of nitrogen practically ceases after which the heating can be conducted. If the temperature is not carefully watched while the mass is at about 200° C., there is liability of a violent reaction which might cause dangerous explosion. The temperature is gradually raised to about 340° C., and is held at this point for half an hour or more. The resulting product is a deep velvety black mass containing partially cracked paraffin and a black powder which seems to consist entirely or substantially of metallic nickel. The paraffin can be removed from the mass by settling and washing with benzol or gasolene, if desired. The remaining powder constituting the catalyzer is a peculiar one, it is magnetic, has a deep black color, a mossy appearance and is usually substantially free from metallic luster. It seems to consist of a black amorphous nickel material.

It is non-pyrophoric and in its preferred form, this product is not readily oxidized. It may be exposed to the air for a considerable period and show little or no deterioration.

Preferably no hydrogen or other reducing gas is introduced into the paraffin wax during the operation. The employment of paraffin or similar material, heated to a temperature of about 340° C., is not broadly claimed in the present application, but in my copending application, Serial No. 314,738, filed August 1, 1919.

To recapitulate the invention embraces the treatment of nickel nitrate or analogous inorganic salt of nickel or for that matter nickel and cobalt or cobalt and other metals of like character capable of acting as effective hydrogen carriers in the hardening of fatty oils, under regulated reducing conditions which prevent violent reaction with the reducing gas or reducing agent thereby precluding sintering of the product obtained.

An advantage in using nickel nitrate is that it is a comparatively cheap salt of nickel being for example substantially cheaper than nickel formate. Also it may be produced readily in a state of purity, free from catalyzer poisons. Also when heated it decomposes giving off gases which disappear from the field of reaction without leaving any residue. For these reasons nickel nitrate is a desirable raw material for making the catalyzer and the present procedure enables its production in an effective manner.

What I claim is:—

1. The process of making a catalyzer suitable for hardening oils which comprises exposing nickel nitrate to a reducing atmosphere in the presence of steam whereby reduction takes place without violent reaction and sintering, thereby yielding finely divided catalytic material of an active character.

2. The process of making a catalyzer suitable for hardening oils which comprises exposing raw catalytic material comprising nickel nitrate to the action of hydrogen and steam at an elevated temperature whereby reduction of the nitrate to finely divided catalytic material is obtained without violent reaction and sintering.

3. The process of making a catalyzer suitable for hardening oils which comprises heating raw catalytic material containing nickel nitrate in a reducing atmosphere which during the initial stages of reduction contains a diluting agent whereby finely divided catalytic material is obtained without violent reaction and sintering.

4. The process of making a catalyzer suitable for hardening oils which consists in heating catalytic raw material containing nickel nitrate in a reducing atmosphere whereby reduction to catalytic material takes place and during the initial stages of the reduction in diluting the reducing atmosphere by a non-reducing agent whereby violent reaction and sintering is avoided.

5. The process of making a catalyzer suitable for the hardening of oils which comprises heating catalytic raw material containing a nickel salt of an acid of the nitrogen oxid group in an atmosphere of hydrogen and in introducing a quantity of steam during the initial stages of reduction in order to avoid sudden and violent reaction of the said nitrate with the hydrogen, and in finishing the reduction with pure hydrogen.

6. The process of making a catalyzer suitable for hardening oils which consists in heating catalytic raw material containing nickel united with an acid of the nitrogen oxid group in a strong reducing atmosphere and in introducing a quantity of a diluting agent during the initial stages of the heating in order to avoid sintering of the nickel compound.

7. A process of making a catalyzer suitable for use in hydrogenating oils, which comprises heating a raw material containing nickel united with an acid containing a nitrogen-oxygen group, in a bathing fluid having a reducing power sufficiently great to form a catalytic material, but not of such power as to produce a sintering of the nickel material, whereby finely-divided catalytic material adapted for use in the hydrogenation of unsaturated fatty materials is obtained.

8. A process of producing a catalytic material suitable for use in hydrogenating operations, which comprises heating a raw material containing nickel united with an acid containing a nitrogen-oxygen group, in a bathing fluid having a reducing power sufficiently great to reduce such nickel material, and maintaining the temperature throughout the operation at not above 400° C., so that no substantial amount of sintering of the product is produced by heat generated by oxidation of the constituents of such bathing fluid, by the oxygen of the nickel compound.

CARLETON ELLIS.